US00RE34995E

United States Patent [19]

Domenig

[11] E Patent Number: Re. 34,995

[45] Reissued Date of Patent: Jul. 18, 1995

[54] ADJUSTABLE RECESSED DOOR HINGE

[75] Inventor: Georg Domenig, Kernersville, N.C.

[73] Assignee: Grass AG, Hochst/Vlbg, Austria

[21] Appl. No.: 57,522

[22] Filed: May 4, 1993

Related U.S. Patent Documents

Reissue of:

[64] Patent No.: 5,175,908
Issued: Jan. 5, 1993
Appl. No.: 809,296
Filed: Dec. 17, 1991

[51] Int. Cl.[6] ..... E05D 7/04
[52] U.S. Cl. ..... 16/237
[58] Field of Search ..... 16/129, 130, 131, 132, 16/164, 236, 237, 335, 337, 370

[56] References Cited

U.S. PATENT DOCUMENTS 3,748,689 7/1973 Grunert ..... 16/237
4,117,540 12/1979 Gorton ..... 16/237
4,159,557 7/1979 Pittasch et al. ..... 16/237
4,338,699 7/1982 Röck ..... 16/237
4,376,324 3/1983 Lautenschlaeger ..... 16/236

OTHER PUBLICATIONS

Mepla catalog, 1992, p. 47, System 140–ACC.

*Primary Examiner*—W. Donald Bray

[57] ABSTRACT

An adjustable recessed door hinge includes a hinge cup displacably insertable in a bore of one of a frame or door member, a hinge pin mounted in the hinge cup, and a hinge arm pivoted at one end on the hinge pin and displacably securable at the other end of the hinge arm to the other of the frame or door member. The hinge cup is dimensioned to be displacable in the bore relative to the frame or door member. Slotted holes for receiving attaching screws guide displacement of the hinge cup and hinge arm relative to the frame and door members.

2 Claims, 3 Drawing Sheets

ADJUSTABLE RECESSED DOOR HINGE

Matter enclosed in heavy brackets [ ] appears in the original patent but forms no part of this reissue specification; matter printed in italics indicates the additions made by reissue.

BACKGROUND OF THE INVENTION

The present invention relates generally to an improved recessed door hinge for mounting a door member on a supporting frame member which enables horizontal and vertical adjustment of the mounted door relative to the supporting frame member.

Adjustable recessed hinges are known in the art and generally comprise a hinge cup which can be fixed in a bore of either a door member or a supporting frame member, a separate mounting plate fixed to the other of the door or supporting frame members, a separate intermediate adjusting part or parts connectable to either or both of the hinge cup and the mounting plate, and a hinge arm interconnectable between intermediate adjusting parts or between an intermediate adjusting part and either of the hinge cup or the mounting plate.

In such devices, the hinge cup is dimensioned to snugly fit into the bore, for example, of a door and is adapted to be secured against displacement within the bore relative to the door and the mounting plate is likewise adapted to be fixed, for example to a supporting frame and secured against displacement relative to the supporting frame. Adjustment or repositioning of the mounted door relative to the supporting frame is provided by one or more separate intermediate adjusting parts which include arrangements of plates, blocks and the like that are slidable in grooves, channels or the like and clamped, for example, with one or more set screws.

Such prior art devices are expensive and difficult to make in that such devices require the fabrication and handling of many parts, including a hinge cup, a hinge arm, a separate mounting plate, and one or more separate intermediate adjusting parts. Further, many of such devices are complicated and inconvenient to install and use, and in some of such devices, removal of the door may be required in order to make an adjustment.

SUMMARY OF THE INVENTION

The present invention overcomes the problems associated with the prior art devices and provides an adjustable recessed hinge for mounting a door member on a supporting frame member which is simple and inexpensive to make and easy to install and use.

To achieve these objects in accordance with the invention, an adjustable recessed hinge for mounting a door member on a supporting frame member is provided that includes a hinge cup which is displaceably insertable in a bore of either a frame member or a door member, a hinge pin mounted in the hinge cup, and a hinge arm having one end pivoted on the hinge pin and having an opposing end on which is formed a hinge plate that is displaceably securable to the other of the frame or door members.

Preferably, the hinge plate of the hinge arm is displaceable relative to the member to which it is secured in a direction which is parallel to the pivot axis of the hinge pin, and the hinge cup is configured and dimensioned to be displaceable within the bore relative to the member to which it is secured in a direction which is perpendicular to the pivot axis of the hinge arm.

Additionally, a slotted hole having a longitudinal axis extending parallel to the pivot axis of the hinge pin is provided in the hinge plate to receive a fastening screw for securing the hinge plate to the particular member and, in cooperation with the fastening screw, to guide the displacement of the hinge plate in such direction. Thus, in an arrangement of an upright door mounted on an upright, stationary supporting frame member, the door member can be adjusted or repositioned vertically relative to the supporting frame member on loosening of the fastening screw in the slotted hole of the hinge plate of the hinge arm.

Further, the hinge cup has a securing flange extending outwardly from each of opposing side portions of the top edge of the hinge cup, each of which securing flanges is provided with a slotted hole having a longitudinal axis which is perpendicular to the pivot axis of the hinge pin to receive a fastening screw for securing the hinge cup to the particular member and, in cooperation with the fastening screws, to guide the displacement of the hinge cup. In a similar arrangement of an upright door mounted on an upright, stationary supporting frame member, the door member can be adjusted or repositioned horizontally relative to the supporting frame member on loosening of the fastening screws in the slotted holes of the securing flanges.

These and other objects and advantages of the present invention will become more apparent after consideration of the following detailed specification taken in conjunction with the accompanying drawings wherein like characters of reference designate like parts through the several views.

DETAILED DESCRIPTION OF THE DRAWINGS

Reference will now be made in detail to one or more preferred embodiments of the invention which are illustrated in the accompanying drawings.

Figure 1:
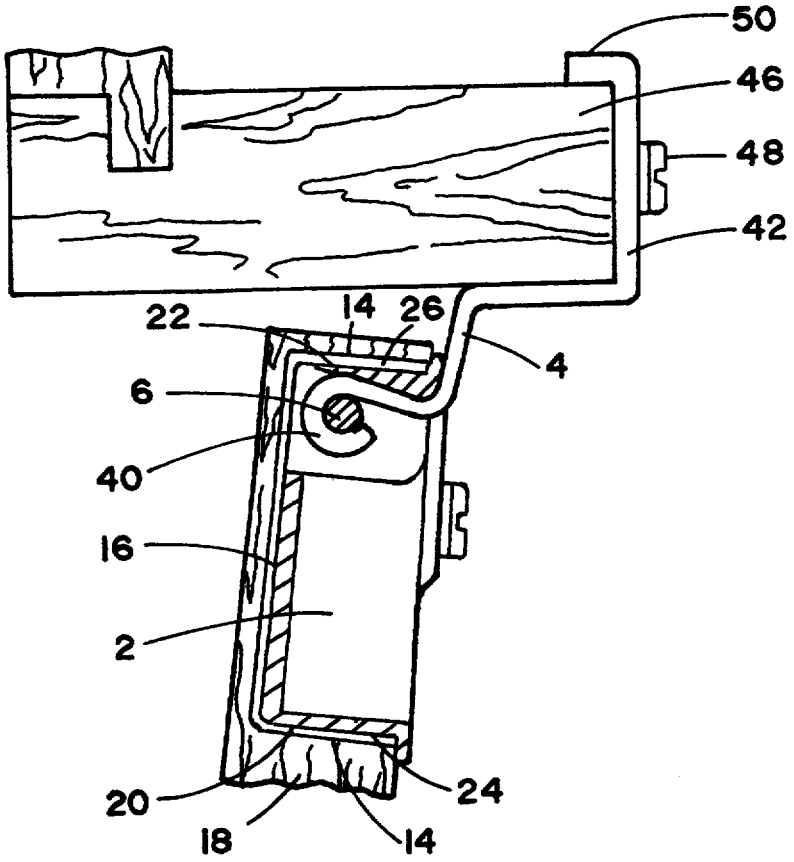
FIG. 1 is a section view through a hinge embodying the invention mounted on a door member and supporting frame member with the hinge in the open position.
Figure 2:
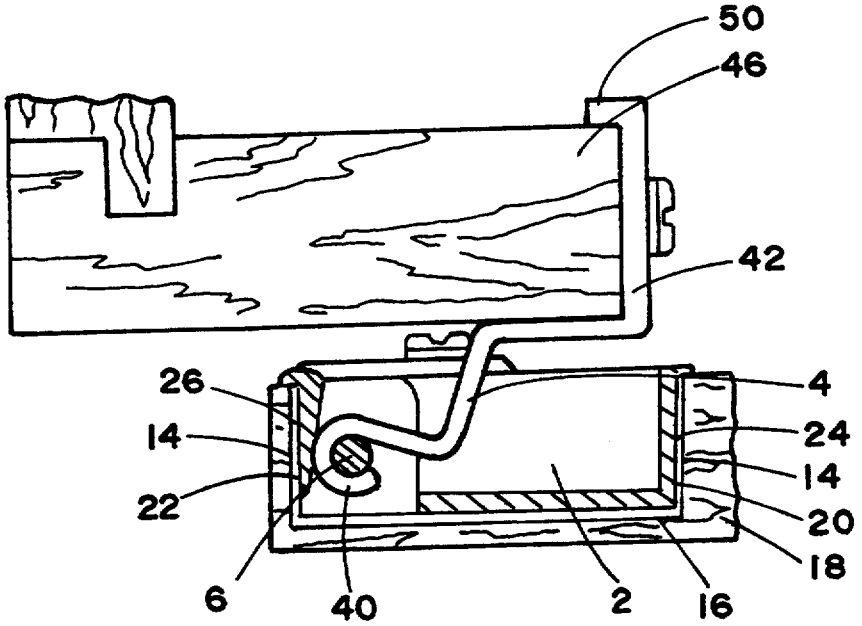
FIG. 2 is a section view of the hinge of FIG. 1 with the hinge in the closed position.
Figure 3:
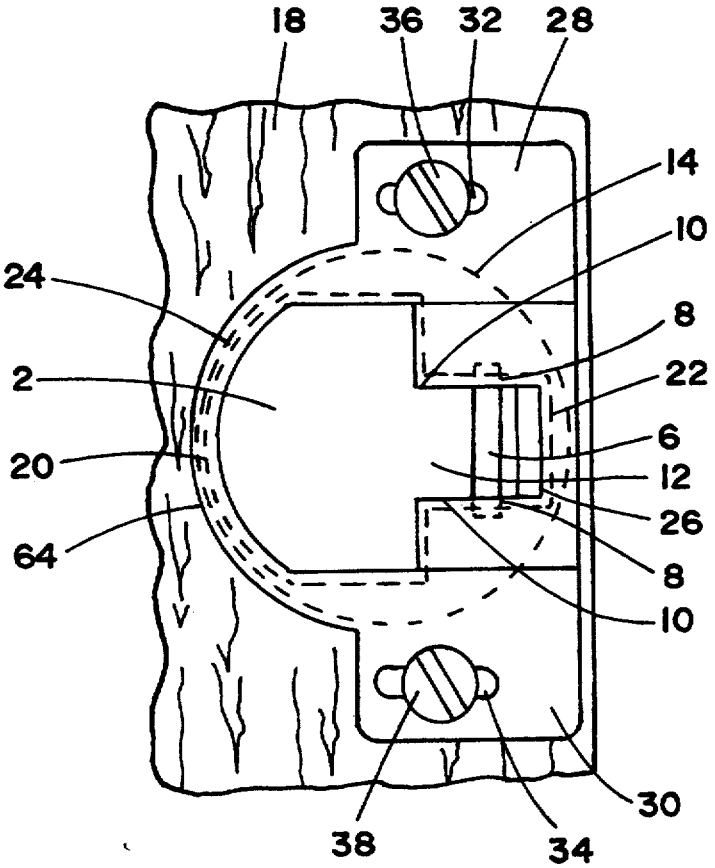
FIG. 3 is a top plan view of the hinge cup of the hinge of FIG. 1 but omitting the hinge arm.

Referring to FIGS. 1 to 3, the adjustable recessed hinge comprises a hinge cup 2 to which hinge arm 4 is connected. Hinge arm 4 is pivoted on hinge pin 6 which is engaged at both ends in seatings 8 within sidewalls 10. Sidewalls 10 define between them a recess 12 within which hinge arm 4 engages and is pivotable on hinge pin 6.

Hinge cup 2 is inserted into a bore defined by a substantially circular interior wall 14 and bottom 16 on the inside of a door member 18. Hinge cup 2 has front and rear exterior walls 20, 22 spaced diametrically from each other a distance which is less than the diameter of the interior of the bore, leaving spaces 24, 26 between interior wall 14 of the bore and exterior walls 20, 22, respectively, of hinge cup 2 to allow displacement or shifting of the position of hinge cup 2 within the bore relative to door member 18.

Referring to FIG. 3, a circumferential flange 64 is provided at the top edge of hinge cup 2 which engages the top edge of the bore and provides a limit for the depth of insertion of hinge cup 2 into the bore. Hinge cup 2 also has a pair of securing flanges 28, 30 which extend outwardly from opposing sides of the top edge of hinge cup 2, each of which is provided with a slotted hole 32, 34., and each of which has a longitudinal axis that extends perpendicular to the pivot axis of hinge pin 6. Hinge cup 2 is secured within the bore by the insertion through slotted holes 32, 34, respectively, of fastening screws 36, 38 which can be driven into door 18.

Figure 4:
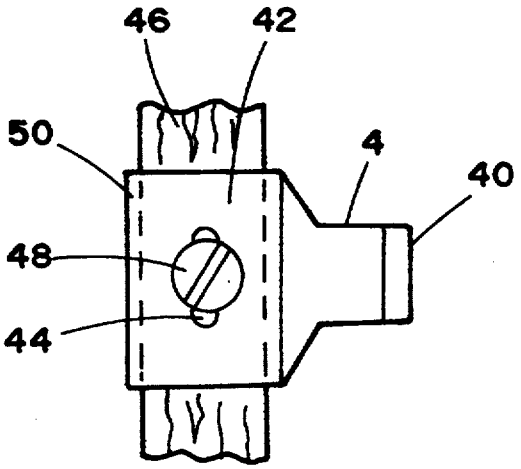
FIG. 4 is a top plan view of the hinge arm of the hinge of FIG. 1 but omitting the hinge cup.

Referring to FIGS. 1, 2, and 4, hinge arm 4 is pivoted at end 40 on hinge pin 6, and hinge plate 42 is formed integrally on the opposing end of hinge arm 4. Hinge plate 42 is provided with at least one slotted hole 44 having a longitudinal axis which extends parallel to the pivot axis of hinge pin 6. Hinge plate 42 is secured to supporting frame member 46 by the insertion of a fastening screw 48 through slotted hole 44 which can be driven into supporting frame member 46. Preferably, hinge plate 42 is provided with ledge 50 which engages a corner of supporting frame member 46 to further secure hinge plate 42. However, ledge 50 can be omitted entirely from hinge plate 42.

Displacement or repositioning of the door member 18 relative to supporting frame member 46 in a direction perpendicular to the pivot axis of hinge pin 6 can be accomplished by loosening of fastening screws 36, 38 and shifting hinge cup 2 within the bore in the direction of the longitudinal axes of slotted holes 32, 34 within the limits afforded by spaces 24, 26 between interior wall 14 of the bore and exterior walls 20, 22, respectively, of hinge cup 2.

Displacement or repositioning of the door member 18 relative to supporting frame member 46 in a direction parallel to the pivot axis of hinge pin 6 can be accomplished by loosening of fastening screw 48 and shifting hinge plate 42 of hinge arm 4 in the direction of the longitudinal axis of slotted hole 44.

Figure 5:
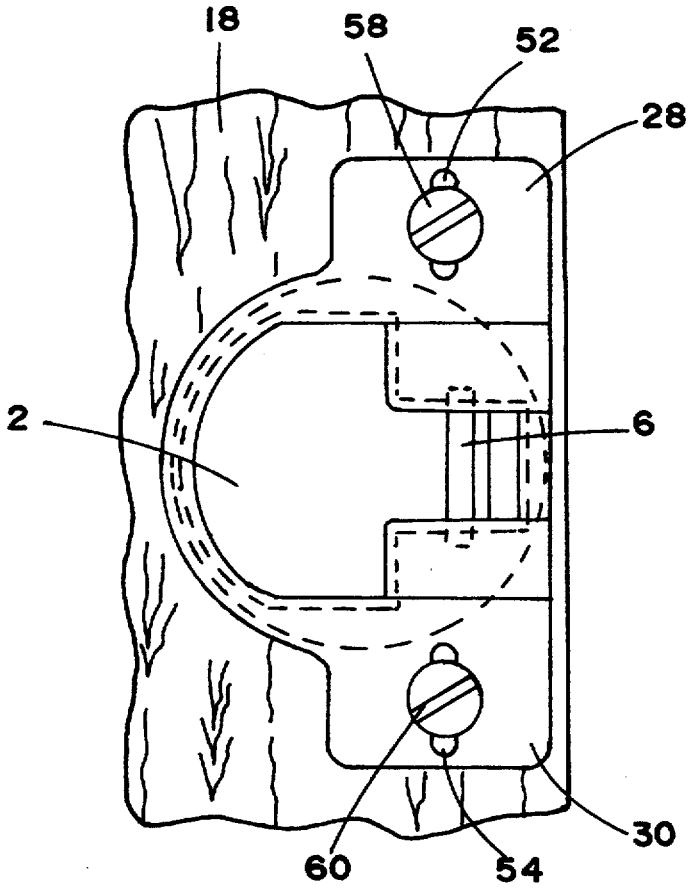
FIG. 5 is a top plan view of an alternate embodiment of the hinge cup of the hinge of FIG. 1 but omitting the hinge arm.
Figure 6:
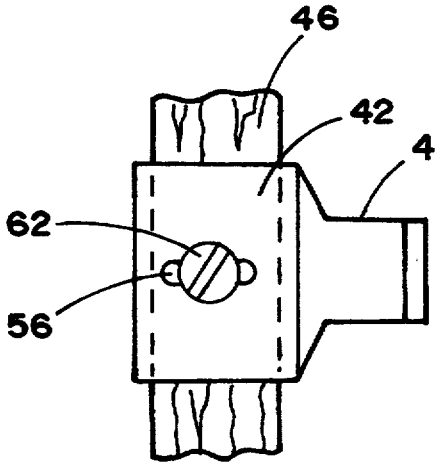
FIG. 6 is a top plan view of an alternate embodiment of the hinge arm of the hinge of FIG. 1 but omitting the hinge cup.

In an alternate embodiment, FIGS. 5, 6, slotted holes 52, 54 are provided in securing flanges 28, 30 of hinge cup 2, each of which has a longitudinal axis extending parallel to the pivot axis of hinge pin 6, and hinge plate 42 of hinge arm 4 is provided with slotted hole 56 having a longitudinal axis which extends perpendicular to the pivot axis of hinge pin 6. In such alternate embodiment, displacement or repositioning of door member 18 relative to supporting frame member 46 in a direction parallel to the pivot axis of hinge pin 6 is accomplished by a loosening of fastening screws 58, 60, and displacement or repositioning of door member 18 relative to supporting frame member 46 in a direction perpendicular to the pivot axis of hinge pin 6 is accomplished by a loosening of fastening screw 62, in which case ledge 50 (FIGS. 1, 2, and 4) is omitted from hinge plate 42 to accommodate repositioning of hinge plate 42 on supporting frame member 46.

Further, the respective mountings of hinge cup 2 on a door member and hinge plate 42 of hinge arm 4 on a supporting frame member may, if desired, be reversed from the standpoint of the door member and supporting frame member, that is, between two parts that can be opened and closed with respect to each other.

What is claimed is:

1. An adjustable recessed hinge for mounting a door member on a supporting frame member, one of which members is provided with a substantially circular bore having a top edge and a predetermined interior diameter, comprising:

a hinge cup adapted to be inserted and [displaceably] secured in a bore of one of a frame member and a door member;

a hinge pin mounted in said hinge cup; and a *one-piece hinge arm having one end pivoted on said hinge pin and having an opposing end defining a hinge plate adapted to be displaceably secured to the other of said frame and door members, wherein said hinge plate is adapted for displacement relative to said other of said frame and door members in a direction parallel to a pivot axis of said hinge arm, said hinge plate having a pair of opposing lateral edges and including portions defining a single slotted hole for receiving a single fastening screw for securing said hinge plate to said other of said frame and door members, said slotted hole being substantially centered between said lateral edges and having a longitudinal axis parallel to said pivot axis of said hinge arm for guiding said displacement of said hinge plate.*

[2. A hinge according to claim 1 wherein said hinge plate is adapted for displacement relative to said other of said frame and door members in one of a direction parallel to a pivot axis of said hinge arm and a direction perpendicular to said pivot axis of said hinge arm.]

[3. A hinge according to claim 2 wherein said hinge cup is adapted for displacement in said bore relative to said one of said frame and door members in the other of said directions parallel to said pivot axis of said hinge arm and perpendicular to said pivot axis of said hinge arm.]

[4. A hinge according to claim 3 wherein said hinge plate is adapted for displacement relative to said other of said frame and door members in said direction parallel to said pivot axis of said hinge arm.]

[5. A hinge according to claim 4 wherein said hinge cup is configured and dimensioned to enable displacement of said hinge cup in said bore relative to said one of said frame and door members in said direction perpendicular to said pivot axis of said hinge arm.]

[6. A hinge according to claim 5 wherein said hinge plate includes portions defining at least one slotted hole adapted to receive a fastening screw therethrough, said slotted hole having a longitudinal axis parallel to said pivot axis of said hinge arm and adapted to guide said displacement of said hinge plate.]

[7. A hinge according to claim 6 wherein said hinge cup has a top edge provided with opposing side portions; and further comprising a pair of securing flanges, one extending outwardly from each of said side portions, each of said securing flanges having a slotted hole formed therein adapted to receive a fastening screw therethrough, each of said slotted holes having a longitudinal axis perpendicular to said pivot axis of said hinge arm and adapted to guide said displacement of said hinge cup.]

[8. A hinge according to claim 7 wherein said hinge cup has front and rear exterior walls spaced diametrically from each other a distance which is less than the interior diameter of said bore to allow said displacement of said hinge cup.]

[9. A hinge according to claim 8 wherein said top edge of said hinge cup has an outwardly extending circumferential flange adapted to engage a top edge of said bore.]

10. A hinge according to claim [9] *1* wherein said [mounting] *hinge* plate includes portions defining a downwardly extending ledge adapted to engage said other of said door and frame members, *said ledge cooperating with said fastening screw received in said slotted hole for further securing said hinge plate to said other of said frame and door members and further guiding said displacement of said hinge plate.*

* * * * *